UNITED STATES PATENT OFFICE.

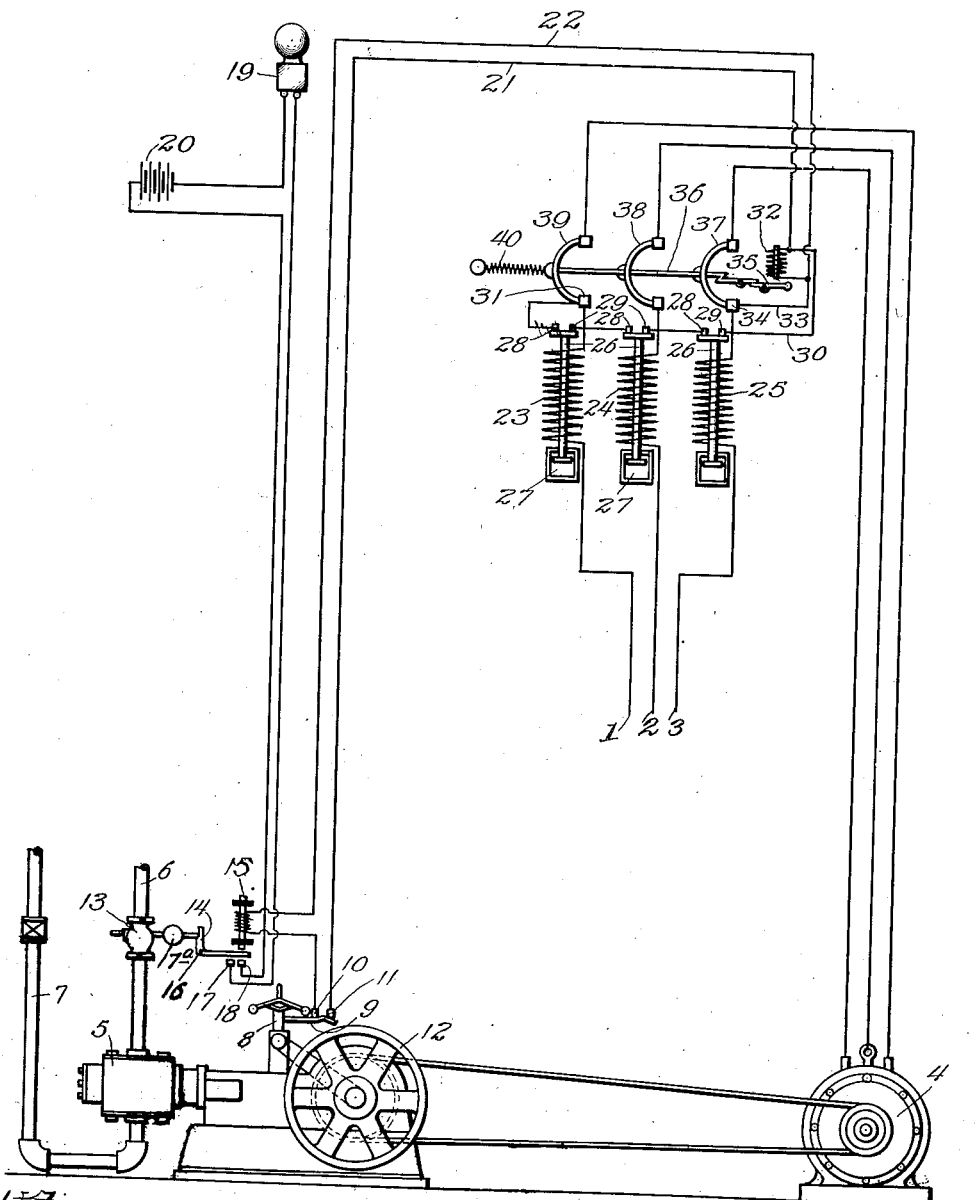

NELS JOLEEN, OF CHICAGO, ILLINOIS.

ELECTRIC CONTROL SYSTEM.

1,229,470.  Specification of Letters Patent.  Patented June 12, 1917.

Application filed April 10, 1914. Serial No. 830,911.

*To all whom it may concern:*

Be it known that I, NELS JOLEEN, a citizen of the United States, residing at Chicago, in the county of Cook and State of Illinois, have invented a certain new and useful Improvement in Electric Control Systems, of which the following is a full, clear, concise, and exact description, reference being had to the accompanying drawings, forming a part of this specification.

My invention relates to electric control systems and is more particularly adapted for the control of refrigerating systems. The control system of my invention has a number of uses, one in particular being the automatic control and protection of machinery used in connection with refrigerating plants.

In a specific instance I may point out that where induction motors are used to drive refrigerating pumps, that these motors very frequently run to their full capacity or even to a fifty per cent. overload, and slight fluctuations in the pressure of the three phase circuit cause these motors to slow down to a point where they will not pick up again after the pressure becomes normal. It is readily apparent that if the motor is running at or over its capacity, that a momentary fluctuation in the supply current will cause the motor to choke, whereby the speed will drop. Upon a resumption of the normal pressure fuses may be blown or other damage done which should be avoided.

In accordance with my invention I provide a circuit breaking device responsive to a no-current or other predetermined condition in either phase so arranged as to open the motor circuit upon a predetermined change in the current conditions of any phase. Simultaneously with the operation of the circuit breaking device aforesaid electromagnetically controlled means are operated to close the intake of refrigerating fluid to the pump, and thus relieve the motor of its load. However it is not necessary in accordance with my structure to open the motor circuit by means of the circuit breaker as I have auxiliary apparatus arranged in connection with the electromagnetic means for controlling the intake so that should the speed of the motor become less than a predetermined amount, that then the intake to the gas pump is closed temporarily to relieve the motor of its load, thus to permit the motor upon a resumption of the normal pressure to resume its former speed, whereupon it is in condition to again take care of its load.

I will explain one form of carrying out my invention by referring to the accompanying drawing which illustrates the same diagrammatically as applied to a refrigerating system.

In the drawing I illustrate a source of three phase supply comprising the conductors 1, 2 and 3 which are adapted respectively to furnish current to the three phase induction motor 4. This induction motor 4 drives a compressor pump 5 used in refrigerating systems and has an intake or suction pipe 6 and an outlet pipe 7 leading to the refrigerating coils. A governor 8 is provided which controls a switch element 9 so that this switch element closes circuit across the contacts 10 and 11 whenever the speed of the pump is at or above its predetermined amount. A suitable fly wheel 12 may be provided if desired. The pump intake 6 has a clapper valve 13 which is so arranged that it is held in its open position by the lever 14 whenever this lever is attracted toward the magnet 15. Whenever there is no current in the magnet, of course the lever 14 falls down, that is, rotates clockwise about its pivot 16, and permits the clapper valve, due to the weight 17ª to fall and close the intake. At the same time that this occurs the lever 14 closes circuit through the contacts 17 and 18, thus to operate an auxiliary alarm 19 associated with the battery 20. The circuit through the electromagnet 15 is controlled on the one hand by the switch element 9 and current is supplied to the circuit through the agency of the conductors 21 and 22 as will be presently explained. The three conductors 1, 2 and 3 each include a serially arranged coil respectively 23, 24 and 25, each of which controls a plunger 26, each of which plungers is associated with a dash pot 27. Each plunger also is adapted to control the circuit through a pair of contacts, respectively the contacts 28 and 29. These contacts 28 and 29 are all in series with the conductor 30.

Now whenever the coils 23, 24 and 25 are energized as shown in the drawing, then the cores are in their uppermost position and the circuit is complete through the three pairs of contacts 28 and 29. The left hand contact 28 is associated with the conductor 1 at the contact segment 31 and the conductor 30 is connected to one terminal of a trip coil 32, the other terminal of which trip coil through the agency of the conductor 33 is connected to the contact point 34 associated with the conductor 3. The trip coil 32 thus receives current from the phase supplied by the conductors 1 and 3, and whenever the current conditions are normal this coil has its armature 35 in the position shown to maintain the switch arm 36 in such a position as to keep the brush contacts 37, 38 and 39 in a condition to maintain a closed circuit of their respective conductors. A spring 40 tends to retract the arm 36 when the trip coil 32 is deënergized to release the catch which holds this arm. The conductors 21 and 22 are connected in parallel with the conductors 33 and 30, thus also to receive their current from the conductors 1 and 3.

Now should the current fail in any of the conductors 1, 2 or 3, the corresponding plunger 26 would drop, thereby opening the circuit through the trip coil 32 and permitting a retraction of the arm 36, thus to open the circuit to the induction motor 4. At the same time, of course, the current supplied to the conductors 21 and 22 would fail, thus to deënergize the electromagnet 15 and permit closure of the clapper valve 13. This clapper valve must be reset by hand. However the circuit breaker is so arranged that a momentary failure of pressure or a predetermined lowering of the current will not operate this circuit breaker. Under such conditions however the motor would slow down and would not pick up again upon a resumption of the normal pressure, which might cause blowing of fuses or other bad effects. Under these conditions the slowing down of the motor would cause a slowing down of the governor 8 and permit opening of the circuit across the contacts 10 and 11, thereby causing a deënergization of the electromagnet 15 and the consequent release of the clapper valve 13. This would relieve the motor of its load within one revolution and permit the motor to resume its normal speed without any injurious effects upon the resumption of normal current and pressure conditions. This would of course operate the alarm 19 so that the valve 13 could be reset to place the system again in a normal operating condition.

From what has been described the nature of my invention will be readily apparent to those skilled in the art, and it will also be readily apparent that modifications may be made without departing from its spirit. Having however thus described one form which the invention may take, what I claim as new and desire to secure by Letters Patent is:

1. In a refrigerating system motor protective apparatus comprising in combinanation a pump, an induction motor for driving said pump to normally pump fluid, a valve to control the flow of fluid to said pump, means directly responsive to the speed of the motor and operative upon a predetermined drop below normal of the speed of said motor to control the closure of said valve to relieve the pump of load to thereby permit the motor when relieved of load to regain its normal speed, and means for manually restoring said valve to its operative position to permit the flow of fluid to said pump.

2. In a refrigerating system motor protective apparatus comprising in combination a pump, an induction motor for driving said pump to normally pump fluid, a valve to control the flow of fluid to said pump, a governor directly responsive to the speed of the motor and operative upon a predetermined drop below normal of the speed of said motor to control the closure of said valve to relieve the pump of load to thereby permit the motor when relieved of load to regain its normal speed, and means for manually restoring said valve to its operative position to permit the flow of fluid to said pump.

3. In a refrigerating system motor protective apparatus comprising in combination a pump, an induction motor for driving said pump to normally pump fluid, a valve to control the flow of fluid to said pump, a governor directly responsive to the speed of the motor and operative upon a predetermined drop below normal of the speed of said motor to control the closure of said valve to relieve the pump of load to thereby permit the motor when relieved of load to regain its normal speed, means for manually restoring said valve to its operative position to permit the flow of fluid to said pump, and electromagnetic means interposed between said valve and said governor.

In witness whereof, I hereunto subscribe my name this 7th day of April A. D. 1914.

NELS JOLEEN.

Witnesses:
 MAX W. ZABEL,
 HAZEL ANN JONES.